Nov. 2, 1926.
J. S. ALGEO
1,604,949
BATTERY JAR
Filed Nov. 21, 1924
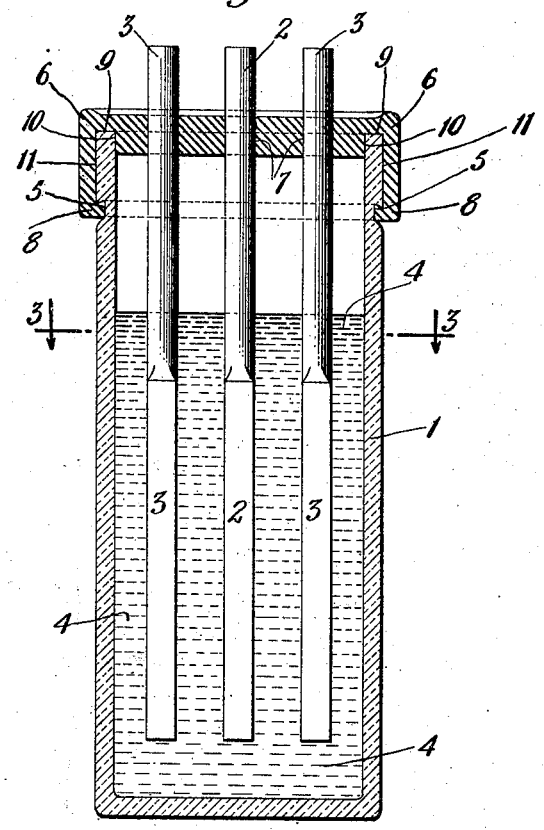
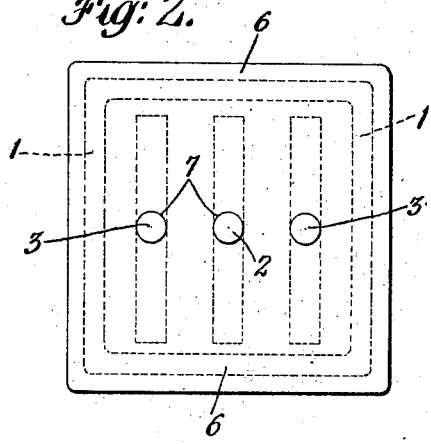
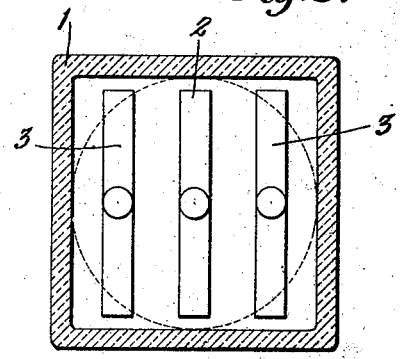
Inventor
JOHN S. ALGEO,
By his Attorney Patented Nov. 2, 1926.

1,604,949

UNITED STATES PATENT OFFICE.

JOHN S. ALGEO, OF WHEELING, WEST VIRGINIA, ASSIGNOR TO HAZEL-ATLAS GLASS COMPANY, A CORPORATION OF WEST VIRGINIA.

BATTERY JAR.

Application filed November 21, 1924. Serial No. 751,327.

The invention relates to storage batteries and particularly to jars or containers for storage batteries. One of the most important uses of my invention is in connection with storage batteries for radio purposes, such as B batteries. Among the objects of my invention is to provide a storage battery jar of efficient construction and particularly adapted for use with a resilient rubber cap, the various objects and advantages of the invention appearing from the following description and the accompanying drawings.

Fig. 1 is a vertical sectional view of an embodiment of my invention. Fig. 2 is a top plan view. Fig. 3 is a sectional view on the line 3—3 of Fig. 1.

In the drawings, a glass jar 1 of square cross section contains the positive plate 2 and negative plates 3—3 and the electrolyte 4. Only a square cross section is shown, but the cross section may also be rectangular and it will be understood that, in my use hereafter of the term "square cross section", I refer also to a rectangular cross section. The mouth of jar 1 has external annular recess 5 a short distance below the top, as for example about an inch. A resilient rubber cap 6 with holes 7 for battery terminals, not shown, fits securely to seal the mouth of jar 1, projection 8 of cap 6 engaging annular recess 5. As cap 6 must be stretched slightly downward in order that projection 8 may engage annular recess 5, there is compression on the top edge 9 of the mouth, and on inner wall 10 as well as on outer wall 11. Preferably, annular recess 5 has its upper surface tapered downwardly so that projection 8 will be more securely retained in position and greater compression exerted upon top edge 9.

It will be observed that a battery jar of square cross section, including the throat, affords more effective space than if the mouth were circular in cross section, as Fig. 3 well illustrates. Battery plates 2 and 3—3 must be replaced from time to time by other plates and it is clear that a mouth of square cross section and a body of the same cross section will permit the use of larger plates or more numerous plates than if the throat were of circular cross section, as indicated in dotted lines.

The necessary parts of the storage battery may be assembled with great facility in the battery jar which is the subject of my invention. The battery plates and their terminals, together with the necessary insulation, can be assembled with the cap; the jar may be filled with a suitable quantity of the electrolyte; the plates then lowered into the jar; and, finally, without any turning or screwing movement, the resilient rubber cap is pressed downward and its projection secured in the annular recess on the outside of the jar. No gaskets, loose rings, washers or screw threads are required. Square jars of my invention may be conveniently placed side by side without such lost space as with round jars.

My invention may be embodied in various modifications and departures from the specific embodiment herein shown and described. What I claim as my invention and desire to secure by Letters Patent is contained in the following claims.

I claim:

1. A battery jar having a rectangular cross section and having its oppositely disposed inner surfaces parallel to each other and unobstructed from end to end, and the outer surface of the jar being provided near its open end with a circumscribing groove having an undercut upper edge.

2. A battery jar having a rectangular cross section and having its oppositely disposed inner surfaces parallel to each other and unobstructed from end to end, and the outer surface of the jar being provided near the open end with a circumscribing groove having an undercut upper edge, the opposite outer surfaces of the jar being parallel to each other and otherwise unbroken and unobstructed from end to end.

3. In a battery jar construction, a jar having a rectangular construction with its inner surfaces parallel and unobstructed from end to end, the outer surface of the jar being provided near its open end with a circumscribing groove having an undercut upper edge, and a cover member formed of resilient material having an inwardly extending flange formed to interlock with the undercut edge of the groove.

4. In a battery jar construction, a jar having a rectangular cross section with its inner surfaces parallel and unobstructed from end to end, the outer surface of the jar being provided near the open end with a circumscribing groove having an undercut upper edge, a cover member formed of resilient material provided with openings therethrough to receive and resiliently grip the terminal portions of the battery plate members, the cover member having a plug portion adapted to fit into the open end of the jar, the cover member having a skirt portion adapted to engage and enclose the outer surfaces of the end portions of the jar, and an inwardly extending flange member formed on the skirt portion and adapted to interlock with the undercut edge of the groove in the jar.

5. A cover member for battery jars formed of resilient material and provided with openings in which to receive and resiliently grip the terminal portions of the battery plates, said cover member having a plug portion to fit into the mouth of the jar, said cover member having a skirt portion to engage and grip the outer surfaces of the jar, and an inwardly extending flange member formed on the skirt portion to interlock with an undercut groove on the outer surface of the jar.

JOHN S. ALGEO.